No. 839,195. PATENTED DEC. 25, 1906.
W. G., W. B. & J. L. POWELL.
TAIL HOLDER FOR ANIMALS.
APPLICATION FILED FEB. 3, 1906.
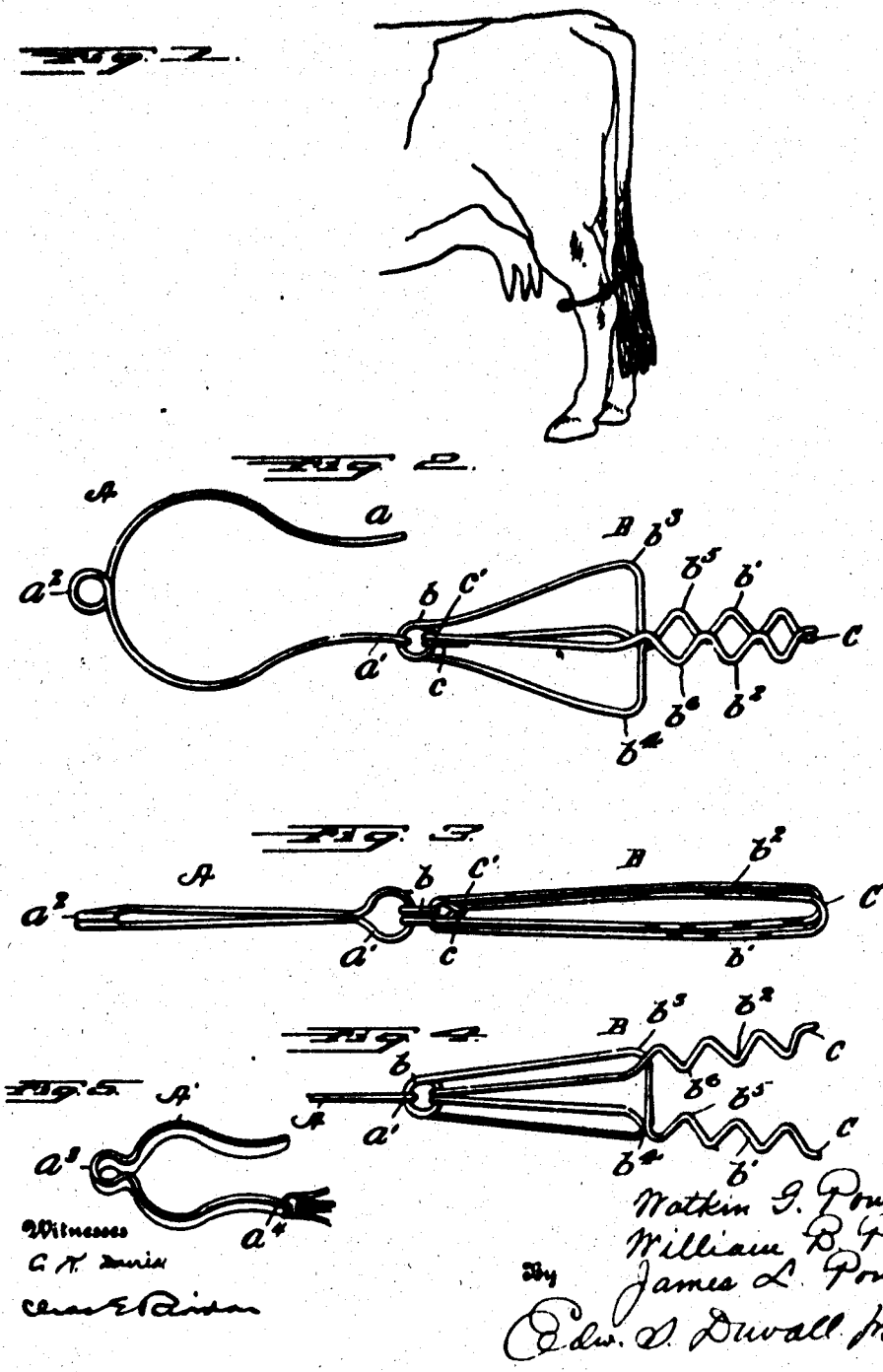

UNITED STATES PATENT OFFICE.

WATKIN G. POWELL, WILLIAM B. POWELL, AND JAMES L. POWELL, OF SHADELAND, PENNSYLVANIA.

TAIL-HOLDER FOR ANIMALS.

No. 839,195.

Specification of Letters Patent.

Patented Dec. 25, 1906.

Application filed February 3, 1906. Serial No. 299,342.

*To all whom it may concern:*

Be it known that we, WATKIN G. POWELL, WILLIAM B. POWELL, and JAMES L. POWELL, citizens of the United States, residing at Shadeland, in the county of Crawford and State of Pennsylvania, have invented certain new and useful Improvements in Tail-Holders for Animals, of which the following is a specification.

Our invention relates to improvements in tail-holders for animals, and it is especially adapted for use when milking cows.

The object of the invention is to provide means for securing the tail of the animal to prevent switching of the same and when used upon a cow to prevent interference of the tail with the milking operations, while at the same time a certain amount of freedom is allowed to the animal's tail. We attain these objects by the mechanism illustrated in the accompanying drawings, in which—

Figure 1 is a view of the hind legs of a cow with the tail-holder in position and securing the tail. Fig. 2 is a top plan view of the device. Fig. 3 is a side elevation of the same, and Fig. 4 is a detail view of the tail-clamp. Fig. 5 is a detail view of the modification.

Similar letters refer to similar parts throughout the several views.

The leg-clasp A is constructed of spring-wire bent substantially U shape and is formed into eyes $a\ a'$ at the ends of the arms, which said arms are curved inwardly to provide a good purchase upon the leg of the animal. To secure the necessary elasticity for this leg-clasp, the wire near its center is bent upon itself spirally one or more turns, as indicated at $a^2$. Linked in eye $a'$ is the tail-clasp B. This member is constructed of spring-wire and is bent upon itself near its center one or more turns spirally to form a spring $b$ for the tail-clasping jaws $b'\ b^2$. The coil $b$ also forms an eye which is engaged by the eye $a'$ of the leg-clasp. The wire of this member extending outwardly from the spring coil $b$ is bent in the shape substantially of a triangle and formed with the angular shoulders $b^3\ b^4$, and the wire is then extended a suitable length at right angles to the base of the triangle and crimped or corrugated, as at $b^5$ and $b^6$, to form the jaw-clasps and is then bent upon itself to form loops which are overlapped, as may be seen in Fig. 3, which crosses the wire at C, so as to limit the movement of the spring-jaws. The remaining length of the wire is similarly crimped or corrugated with the crimps registering with those already described, and the ends beyond the shoulders $b^3\ b^4$ are carried straight back to the coil $b$, through which they are passed oppositely and bent upon themselves, as at $c$ and $c'$, thus completing the formation of the tail-clasp. By this construction the crimped jaws $b'$ and $b^2$ may be opened, as shown in Fig. 4, by compression of the shoulders $b^3\ b^4$ with the hand, leaving the other hand free to throw the tail into the grasp of the jaws where it will be caught and firmly held against withdrawal as soon as the shoulders $b^3\ b^4$ are released. By forming the jaws in the shape of loops and overlapping them, as just described, the upper and lower crimps of each jaw cross those of the other when closed and held in engagement at C by the action of the spring-coil of this tail-clasp.

As shown in Fig. 1 of the drawings, the clasp A is placed upon the animal's leg, preferably above the hock-joint in proximity to the brush of the tail, and the latter is then caught in place, as just described. The link connection between the leg-clasp and the tail-clasp will permit limited movement of the tail, but will prevent what is commonly known as "switching," which is annoying to any one engaged in milking a cow. The formation of the jaws of the clasp into crimps or corrugations prevents the tail from being pulled out of the device by any exertion of the animal. It may be added here that the leg-clasp, while shown of spring-wire, may be constructed of a spring-band or flattened wire, and it will be noted that the shape of the clasp is such that it will very nearly conform to the animal's leg, while the eyes or loops $a$ and $a'$ by being formed in a plane opposite to the plane of the clasp will present flat bearing-surfaces against the animal's leg and at the same time increase the bearing-surface so that the clasp will hold itself in proper place without giving pain or discomfort to the animal. The arms of this clasp by being bent inwardly, as shown, place the larger amount, if not all of the pressure, upon the leg where the eyes or loops $a$ and $a'$ touch it, and thereby relieves the leg of the pressure of the circular wire when formed, as shown, in the preferred form.

In the detail view, Fig. 5, the clasp A' is constructed of a flat band of spring metal bent in the shape described in the preferred form, with a coil $a^3$ near the center to provide additional elasticity and a single eyelet $a^4$ in one arm of the clasp to engage with a tail-clasp, which is constructed of wire and in every respect is identical with the clasp already described, and shown in Figs. 2, 3, and 4.

Having thus fully described our invention, what we claim as new, and desire to secure by Letters Patent, is—

1. In a tail-holder, the combination with a leg-clasp, of a tail-clasp consisting of the substantially parallel and movable jaws bent in the form of loops with crimps or corrugations therein, the said jaws being overlapped to permit the crimps of the two jaws to cross.

2. In a tail-holder, the combination with a leg-clasp, of a tail-clasp movably connected thereto and consisting of the substantially parallel and spring-actuated jaws, bent in the form of loops with crimps or corrugations therein, the said jaws being overlapped to permit the crimps therein to cross when closed.

In testimony whereof we affix our signatures in presence of two witnesses.

WATKIN G. POWELL.
WILLIAM B. POWELL.
JAMES L. POWELL.

Witnesses:
WALTER J. SKEELS,
ROBERT W. PATTON.